US009229935B2

(12) United States Patent
Anders et al.

(10) Patent No.: US 9,229,935 B2
(45) Date of Patent: Jan. 5, 2016

(54) SIMULATING ACCESSES FOR ARCHIVED CONTENT

(71) Applicant: International Business Machines Corporation, Armonk, NY (US)

(72) Inventors: Kelley L. Anders, East New Market, MD (US); Trudy L. Hewitt, Cary, NC (US); Michael S. Thomason, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 213 days.

(21) Appl. No.: 13/749,299

(22) Filed: Jan. 24, 2013

(65) Prior Publication Data
US 2014/0207814 A1 Jul. 24, 2014

(51) Int. Cl.
*G06F 17/30* (2006.01)
*G06F 17/00* (2006.01)

(52) U.S. Cl.
CPC .... *G06F 17/30011* (2013.01); *G06F 17/30424* (2013.01)

(58) Field of Classification Search
CPC ............... G06F 17/3089; G06F 17/24; G06F 17/30067; G06F 17/30899; G06F 9/546; G06F 17/214; G06F 17/2229; G06F 17/30056; G06F 17/30079; G06F 17/30106; G06F 17/30117; G06F 17/30867; G06F 17/3087; G06F 17/30876; G06F 17/30879; G06F 3/1204
See application file for complete search history.

(56) References Cited

U.S. PATENT DOCUMENTS

| | | | |
|---|---|---|---|
| 5,893,908 A | 4/1999 | Cullen et al. | |
| 7,680,937 B2 * | 3/2010 | Miller et al. | 709/226 |
| 7,725,499 B1 | 5/2010 | von Lepel et al. | |
| 8,001,471 B2 | 8/2011 | Shaver et al. | |
| 8,015,491 B2 | 9/2011 | Shaver et al. | |
| 8,046,387 B2 | 10/2011 | Nelson | |
| 2003/0046389 A1 | 3/2003 | Thieme | |
| 2004/0168084 A1 | 8/2004 | Owen et al. | |
| 2004/0236801 A1 | 11/2004 | Borden et al. | |
| 2005/0114784 A1 * | 5/2005 | Spring et al. | 715/762 |
| 2005/0251502 A1 | 11/2005 | McCauley et al. | |
| 2007/0073673 A1 | 3/2007 | McVeigh et al. | |
| 2007/0100829 A1 | 5/2007 | Allen et al. | |
| 2008/0201225 A1 | 8/2008 | Maharajh et al. | |
| 2008/0313119 A1 | 12/2008 | Leskovec et al. | |
| 2009/0287684 A1 | 11/2009 | Bennett | |

(Continued)

OTHER PUBLICATIONS

Zhu et al., "IBM Enterprise Content Management and IBM Information Archive: Providing the Complete Solution", International Technical Support Organization, ibm.com/redbooks, Jan. 2011, 158 pages.

(Continued)

*Primary Examiner* — Yicun Wu
(74) *Attorney, Agent, or Firm* — Farrokh Pourmirzaie; Edell, Shapiro & Finnan, LLC

(57) ABSTRACT

According to one embodiment of the present invention, a system identifies content for publication by determining a projected usage of unpublished content. The system applies one or more predefined criteria for publication to the projected usage. The content is published in response to the projected usage satisfying the criteria for publication. Embodiments of the present invention further include a method and computer program product for identifying content for publication in substantially the same manners described above.

20 Claims, 3 Drawing Sheets

(56) References Cited

U.S. PATENT DOCUMENTS

| | | | |
|---|---|---|---|
| 2010/0030742 A1* | 2/2010 | Surmont et al. | 707/3 |
| 2011/0040792 A1* | 2/2011 | Perry | 707/783 |
| 2011/0161340 A1* | 6/2011 | McCloskey et al. | 707/765 |
| 2011/0320425 A1 | 12/2011 | Nelson | |
| 2012/0030181 A1 | 2/2012 | Adhiraju et al. | |
| 2012/0239684 A1* | 9/2012 | Yamada | 707/769 |
| 2012/0310884 A1* | 12/2012 | Tennant | 707/627 |
| 2013/0275390 A1* | 10/2013 | Ozzie et al. | 707/687 |
| 2014/0207817 A1 | 7/2014 | Anders et al. | |

OTHER PUBLICATIONS

IBM, "Content Projection and Synchronisation With Different Content Repositories in Virtual Worlds", www.ip.com, Jan. 26, 2009, 5 pages.

"Weighted Role Based Access Control System and Mechanism for Unstructured and Semistructed data", www.ip.com, Jun. 30, 2010, 3 pages.

* cited by examiner

SIMULATING ACCESSES FOR ARCHIVED CONTENT

BACKGROUND

1. Technical Field

Present invention embodiments relate to information systems, and more specifically, to simulating accesses of archived content in order to identify documents that should be published,

2. Discussion of the Related Art

Electronic information sources (e.g., websites) that provide user-searchable content sometimes archive old or infrequently accessed documents. As a result, the documents no longer appear in user searches. For example, a document may relate to a non-current product version. When user accesses of the document fall to a low level, a website manager may archive the document in order to avoid cluttering users' search results with outdated information.

BRIEF SUMMARY

According to one embodiment of the present invention, a system identifies content for publication by determining a projected usage of unpublished content. The system applies one or more predefined criteria for publication to the projected usage. The content is published in response to the projected usage satisfying the criteria for publication. Embodiments of the present invention further include a method and computer program product for identifying content for publication in substantially the same manners described above.

BRIEF DESCRIPTION OF THE SEVERAL VIEWS OF THE DRAWINGS

Generally, like reference numerals in the various figures are utilized to designate like components.

DETAILED DESCRIPTION

Present invention embodiments pertain to identifying content to publish. A simulation estimates usage of the content were the content available for access (e.g., published on the web). The simulation model is based on empirical data, such as accesses of related documents, captured search queries, and keywords and terms of the content.

One aspect of an embodiment of the present invention is to dynamically determine whether content that has been archived would provide value if republished. Another aspect is to relieve content creators from having to re-create content that already exists but is not currently accessible to users. Still another aspect is to ensure that users searching for particular content will be able to find the content if it exists.

In an example scenario, content is created and published on the web to address an issue related to version N of a product. Later, version N+1 of the product is released, the issue does not arise, and the frequency with which users access the content drops accordingly. As a result, the content administrator decides to archive the content. However, the issue resurfaces in version N+2, and users cannot find the solution because the content created to address the issue has been archived. An embodiment of the present invention notifies the administrator that the demand for the archived content has increased to a level that would warrant reinstating it for user access. Alternatively, the administrator may define conditions for automatically republishing the archived content.

Figure 1:
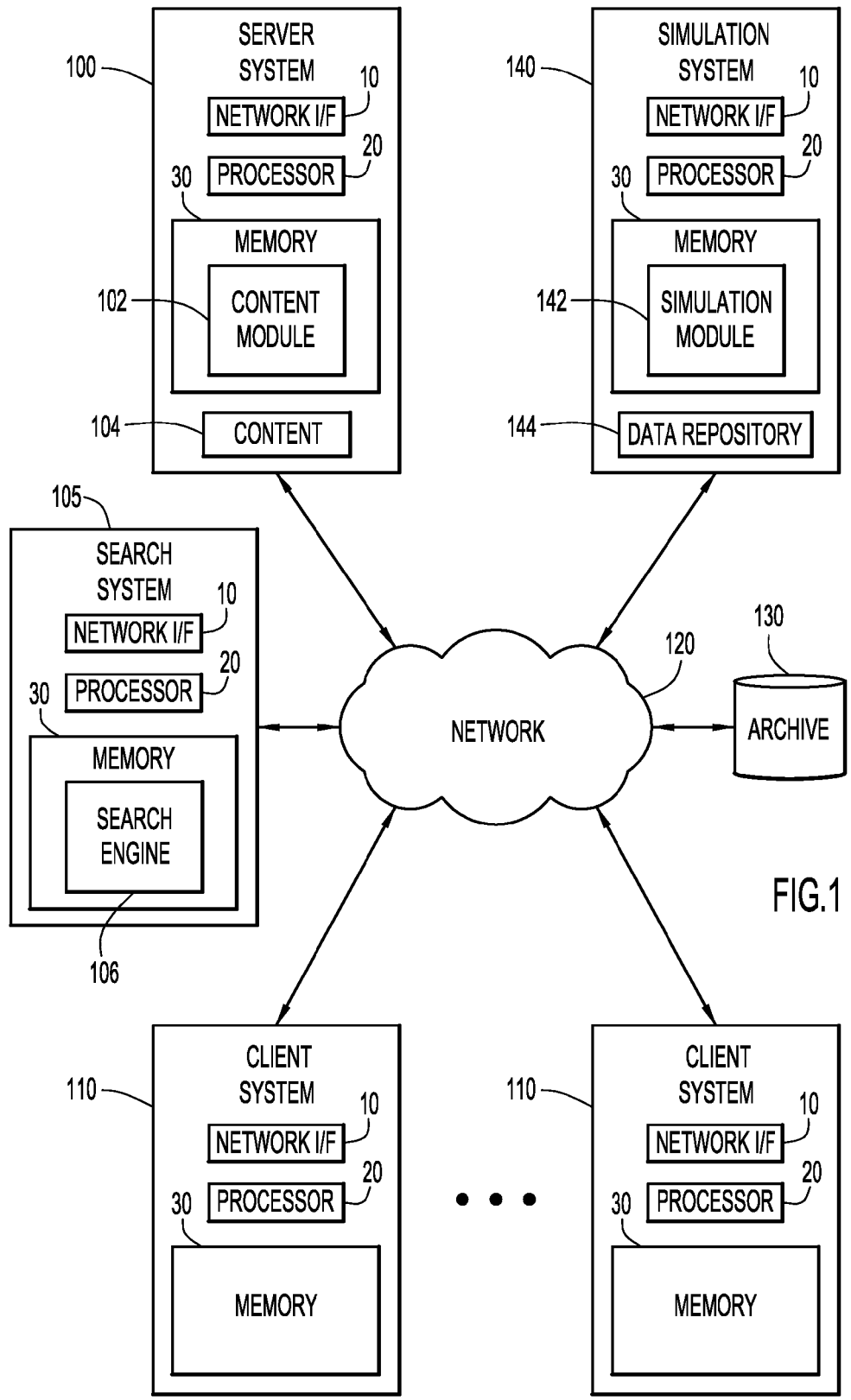
FIG. 1 is a diagrammatic illustration of an example computing environment of an embodiment of the present invention

An example computing environment for a present invention embodiment is illustrated in FIG. 1. Specifically, the environment includes one or more server systems 100, one or more search systems 105, one or more client or end-user systems 110, one or more archives 130, and one or more simulation systems 140. Server systems 100, search systems 105, client systems 110, archive 130, and simulation system 140 may be remote from each other and communicate over a network 120.

Network 120 may be implemented by any number of any suitable communications media (e.g., wide area network (WAN), local area network (LAN), Internet, intranet, etc.). Alternatively, any number of server systems 100, client systems 110, archives 130, simulation systems 140, and search systems 150 may be local to each other, and communicate via any appropriate local communication medium (e.g., local area network (LAN), hardwire, wireless link, intranet, etc.).

A server system 100 may include a content module 102 and content 104. The content module (e.g., web server, electronic help system, online catalog, dictionary, etc.) provides users access to content 104.

Search system 105 includes a search engine 106 to processes search queries and return search results including information or references to information within content 104. Alternatively, the search engine may be local to server system 100. The content module and/or search engine may receive feedback from users (e.g., by surveying the users) regarding the extent to which the search results provided the content sought by the user. The content module, search engine, and content may be distributed across plural server systems, search systems, or other systems in communication with the server system.

Client systems 110 enable users to submit queries to search engine 106 (e.g., via network 120) and receive search results and content. The client systems may present any graphical user (e.g., GUI, etc.) or other interface (e.g., command line prompts, menu screens, etc.) to receive commands from users and communicate with the content module, search engine, and other modules or services.

Archive 130 contains information absent from content 104 (e.g., documents that have been removed from content 104 because they are outdated, rarely accessed, etc.). The archive may be implemented by any conventional or other database or storage unit, may be local to or remote from server system 100 and simulation system 140, and may communicate via any appropriate communication medium (e.g., local area network (LAN), wide area network (WAN), Internet, hardwire, wireless link, intranet, etc.).

Simulation system 140 includes a simulation module 142 and data repository 144. Simulation module 142 uses data from data repository 144 to project accesses of archived content in order to identify documents that should be republished. The data repository may include information about how users have searched for and accessed documents in the past, mappings of keywords and archived content, and criteria for determining whether items of archived content should be published (e.g., by moving the items into content 104).

Server systems 100, search system 105, client systems 110, and simulation system 140 may be implemented by any conventional or other computer systems preferably equipped with a display or monitor, a base (e.g., including at least one processor 20, memories 30 and/or internal or external network interface or communications devices 10 (e.g., modem, network cards, etc.), optional input devices (e.g., a keyboard, mouse, or other input device), and any commercially available and custom software (e.g., content module software, search engine software, simulation module software, etc.).

Simulation module 142 may include one or more modules or units to perform the various functions of present invention embodiments described below (e.g., indexing archived content, gathering information about past searches, simulating usage of archived content, reporting results, determining whether to republish content, etc.), may be implemented by any combination of any quantity of software and/or hardware modules or units, and may reside within memory 30 of a simulation system, server system and/or client systems for execution by processor 20.

Figure 2:
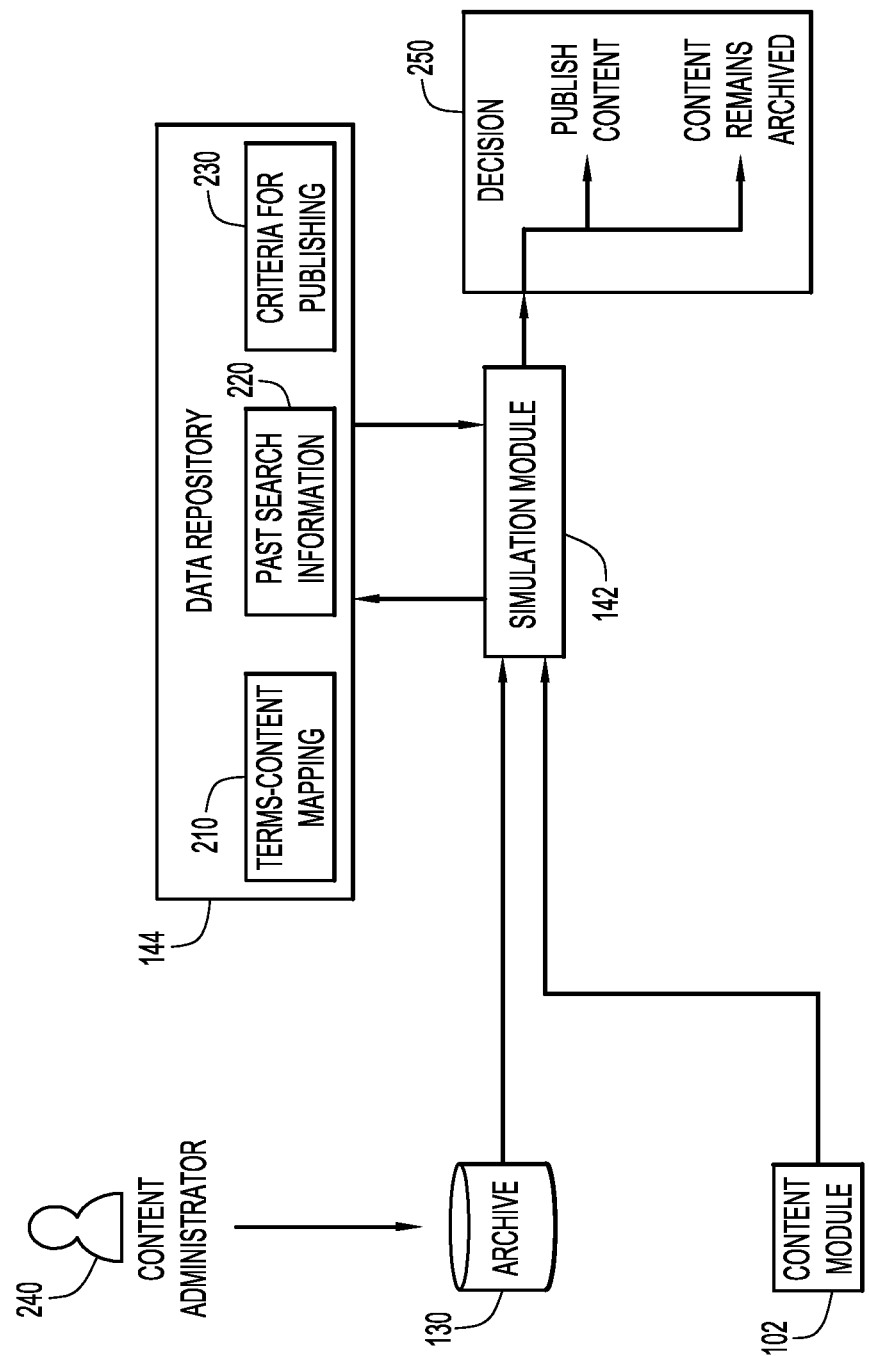
FIG. 2 is a block diagram of a simulation module and data repository according to an embodiment of the present invention.

A block diagram of a simulation module and data repository for identifying archived content to republish according to an embodiment of the present invention is illustrated in FIG. 2. Data repository 144 may include a terms-content mapping 210, past search information 220, and criteria for republishing 230. The terms-content mapping 210 contains terms with which users may attempt to find content (e.g., by submitting the terms to a search engine). Examples of terms include words or phrases found in a text-based document; tags, captions, or other metadata assigned to an image or other data file; uniform resource locators; etc. Terms may include combinations of terms. The mapping may associate terms with archived documents and/or vice versa.

Past search information 220 contains records of how users have located or attempted to locate content. By way of example, these records may include queries submitted to search engine 106 (e.g., via client system 110, network 120, server system 100, and content module 102) and may further include corresponding search results, documents accessed from the search results, user feedback (e.g., the results of document usefulness surveys), etc.

Criteria for publishing 230 may specify that content should be published if the projected number or rate of accesses exceeds a predetermined threshold, or if the content would provide a match to recent queries for which no results were found.

The simulation module may communicate with the archive, from which it receives content placed in the archive by content administrator 240, and with data repository 144 to read and write (e.g., for initializing or updating) the term-content mapping, past search information, and search criteria. The simulation module generates a decision 250 whether content should be published or should remain in the archive.

Figure 3:
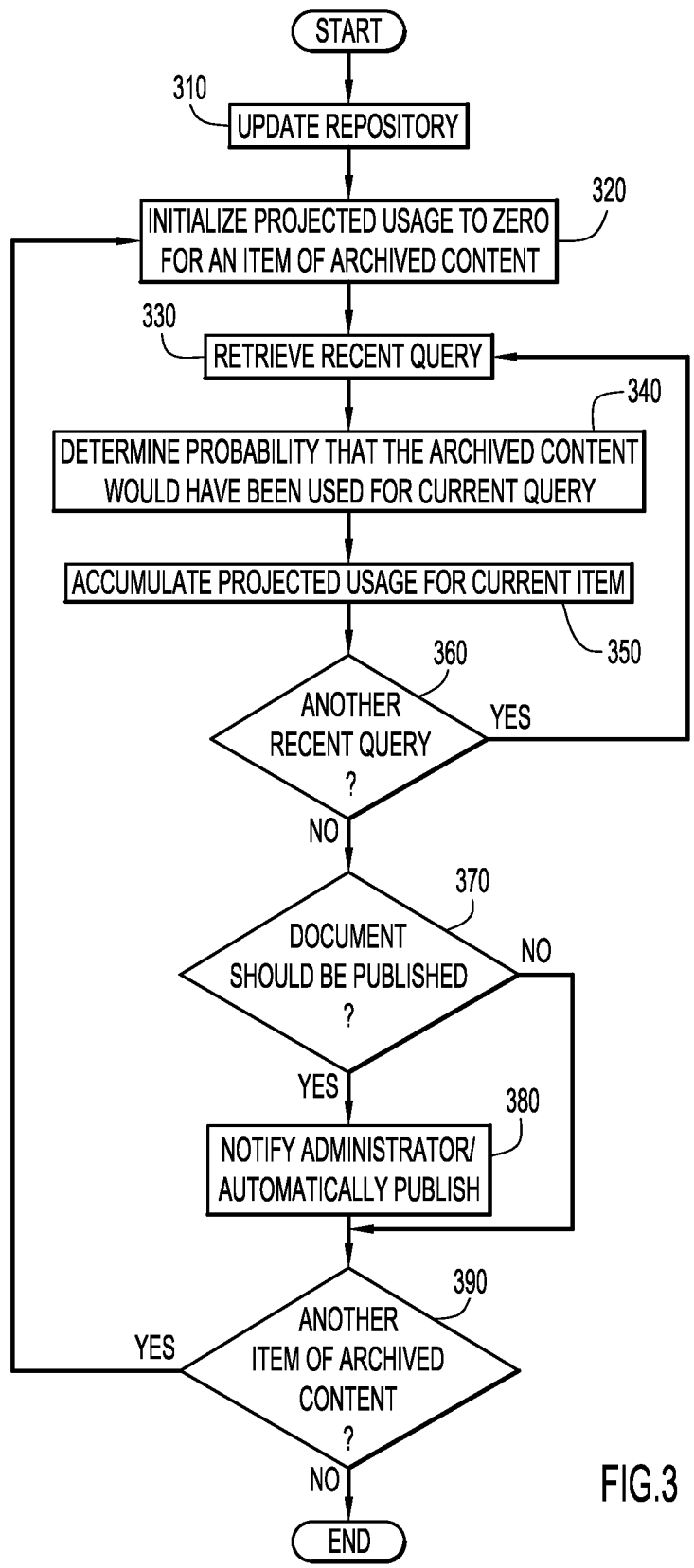
FIG. 3 is a procedural flow chart illustrating an example manner in which content that should be published is identified based on projected usage of the content.

A manner in which the simulation module identifies archived content to publish (e.g., via simulation system 140, server system 100, and/or client system 110) according to an embodiment of the present invention is illustrated in FIG. 3. At step 310, the data repository is initialized or updated with new data. For example, the simulation module may read content from archive 130 and analyze the content to identify terms for archived content and generate the terms-content mapping. If the search engine is local to the content provider, the simulation module may gather some or all past queries and associated search results, document accesses, and user feedback from the search engine and/or content module 102 and store the data in past search information 220. Past queries may include both recent queries (e.g., queries since a document was archived) and historical queries (e.g., queries from a time when the document was available in content 104 and could be found via search engine 106, before it was archived). The simulation module may analyze past queries to identify terms associated with past accesses of a document. If the search engine is not local to the content provider (e.g., it is a general purpose web search engine), the simulation module, an administrator, or other agent may request past search information from the operator of the search engine. For example, information about queries containing terms associated with archived content (e.g., terms appearing in the terms-content mapping) and/or queries for which a user selected a document from content 104 may be requested. The content administrator can define criteria for publishing and configure the simulation module to issue a notice when content should be republished or to automatically republish the content.

The simulation module loops over each item of content in the archive to identify content that should be published. At step 320, the simulation module initializes a projected usage [U] to zero for an item of archived content. The simulation module then loops over a category of queries, retrieving a query of the category at step 330.

The simulation module then loops over past queries belonging to a predetermined category. The category may include all queries in the past search information, recent queries (i.e., queries submitted within a preceding time interval [T], (e.g, an hour, week, month, quarter, year, etc.)), queries for which zero search results were returned, etc. The simulation module retrieves a past query at step 330. At step 340 the simulation module determines an estimated probability [p] that the current item of archived content would have been selected and used from the search results of the cu ent query.

To estimate [p], the search module may compare search terms and accesses from when the content was available at content 104 against search terms and access activity since the item was archived (and removed from content 104). By way of example, consider a document that was accessed 95% of the time that a search query contained four particular search terms when the document was on the web. User feedback associated with those accesses was 80% positive. Since the document was archived, the search engine returns only three results when the same four terms are used, and the feedback associated with those results is 70% negative. Based on this information, the simulation module ray project that user satisfaction for such searches would increase (e.g., by about 56%, i.e., 80% of the 70% negative feedback might turn positive) if that archived document were restored to the web. User feedback information is not required. For example, it may be assumed constant for all queries, and the projected usage may be based number of accesses alone.

Another manner of determining [p] is to determine or estimate where the archived content would have ranked in the search results for the current query if the content had been available. The estimate [p] can be an average of the accesses of documents preceding and following the content in the search results. The average may be weighted, e.g., by proximity in rank and user satisfaction. If content would not appear in the search results, the estimate of [p] is zero.

At step 350, the simulation module accumulates the projected usage for the current item of archived content. For example, [p] is added to [U]. In addition, the simulation module may track any other statistics or properties. By way of example, there may be a separate usage projection for queries that return zero search results or results with low average user satisfaction.

At step 360 the simulation module determines whether any queries in the category remain to be analyzed. If so, processing returns to 330 where the next query is retrieved. Otherwise, the loop over queries ends and [U] provides a basis for projecting usage of the document. For example, [U]/[T] may represent an estimate of the frequency with which the document would be accessed in the future were it published.

The simulation module determines whether the document should be published by applying the criteria for publishing to the projected usage of the document at step 370. For example, the document may be designated for publication if an estimate of the rate at which the document would be accessed exceeds a threshold. If the document should be republished, the simulation module notifies the content administrator at step 380. The system may be configured to automatically publish the document. At step 390, the simulation module determines whether any more items of content in the archive remain to be analyzed. If so, processing returns to step 320 and the usage of the next document is projected. Otherwise, processing ends. Further identification of archived content to publish may occur in a similar manner. For example, the data repository may be updated with the addition of new information (e.g., new user searches, new archived documents, reconfigured criteria for publishing, etc.) regularly or from time to time, and identification of archived content to publish may recur accordingly.

It will be appreciated that the embodiments described above and illustrated in the drawings represent only a few of the many ways of implementing embodiments for simulating accesses of archived content in order to identify documents that should be published.

The topology or environment of the present invention embodiments may include any number of computer or other processing systems (e.g., client or end-user systems, server systems, etc.) and web sites, databases, libraries or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., IBM-compatible, laptop, PDA, mobile devices, etc.), and may include any commercially available operating system and any commercially available or custom software (e.g., simulation module software, content module software, search engine software, etc.). These systems may include any types of monitors and input devices (e.g., keyboard, mouse, voice recognition, touch screen, etc.) to enter and/or view information.

It is to be understood that the software (e.g., simulation module, client software, server software, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, intranet, Internet, hardwire, modem connection, wireless, etc.). For example, the functions of the present invention embodiments may be distributed in any manner among the various simulation, end-user/client, and server systems, and/or any other intermediary processing devices including third party client/server processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., simulation module, client software, server software, etc.) may be available on a computer useable or recordable medium (e.g., magnetic or optical mediums, magneto-optic mediums, floppy diskettes, CD-ROM, DVD, memory devices, etc.) for use on stand-alone systems or systems connected by a network or other communications medium.

The communication network may be implemented by any number of any types of communications network (e.g., LAN, WAN, Internet, intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, intranet, etc.).

The system may employ any number of any conventional or other libraries, databases, data stores or storage structures (e.g., files, databases, data structures, data or other repositories, etc.) to store information (e.g., content, past searches information, term-content mapping, criteria for publishing, etc.). The database system may be implemented by any number of any conventional or other databases, data stores or storage structures (e.g., files, databases, data structures, data or other repositories, etc.) to store information (e.g., content, past searches information, term-content mapping, criteria for publishing, etc.). The simulation module and/or data repository may be included within or coupled to the simulation, server and/or client systems.

The present invention embodiments are not limited to the specific tasks, algorithms, network/environment, or types of content described above, but may be utilized for simulating accesses of content of any kind (e.g., web pages, product catalogs, libraries media, blog entries, social media posts, text-based documents, images, binary data, directories, etc.). Present invention embodiments may use any methods of projecting content usage based on past empirical access data (e.g., frequency analysis, reliability and fuzzy matching, language processing, semantic analysis, information retrieval, automated reasoning, machine learning, etc.).

The present invention embodiments may employ any number of any type of user interface (e.g., Graphical User Interface (GUI), command-line, prompt, etc.) for obtaining or providing information (e.g., submitting queries, configuring criteria, initializing repositories, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A system for identifying content for publication comprising:
   at least one processor configured to:
      analyze unpublished content to identify terms of the unpublished content, wherein the unpublished content is content that is archived and inaccessible to a user;
      analyze past search queries to identify terms that are associated with the terms of the unpublished content;
      estimate a probability that the unpublished content would be selected for a current search query based on the terms of the unpublished content and the terms of past search queries;
      determine a projected usage of unpublished content based on the probability that the unpublished content would be selected from the results of the current search query;
      apply one or more predefined criteria for publication to the projected usage; and
      publish the content in response to the projected usage satisfying the criteria for publication.

2. The system of claim 1, wherein the projected usage is initially set to a value of zero.

3. The system of claim 2, wherein the probability that the unpublished content would be selected for the current search query is added to the initially set value of the projected usage.

4. The system of claim 3, wherein the content was formerly published and selected from results of a past search query.

5. The system of claim 4, wherein the projected usage is further based on information about a user's satisfaction with the search results of past search queries.

6. The system of claim 1, wherein past search queries include search queries occurring in a preceding time interval.

7. The system of claim 1, wherein the past search queries include search queries that returned no useful results.

8. The system of claim 1, wherein past search queries include search queries occurred when the content was formerly published.

9. The system of claim 1, wherein the content is only accessible to a user in a set of search results returned from a search query when the content is published.

10. The system of claim 1, wherein the applied one or more predefined criteria for publication determines an estimated probability that the unpublished content would be selected from a set of search results.

11. A computer program product for identifying content for publication comprising: a non-transitory computer readable storage medium having computer readable program code embodied therewith for execution on a first processing system, the computer readable program code configured to:
   analyze unpublished content to identify terms of the unpublished content, wherein the unpublished content is content that is archived and inaccessible to a user;
   analyze past search queries to identify terms that are associated with the terms of the unpublished content;
   estimate a probability that the unpublished content would be selected for a current search query based on the terms of the unpublished content and the terms of past search queries;
   determine a projected usage of unpublished content based on the probability that the unpublished content would be selected from the results of the current search query;
   apply one or more predefined criteria for publication to the projected usage; and
   publish the content in response to the projected usage satisfying the criteria for publication.

12. The computer program product of claim 11, wherein the projected usage is initially set to a value of zero.

13. The computer program product of claim 12, wherein the probability that the unpublished content would be selected for the current search query is added to the initially set value of the projected usage.

14. The computer program product of claim 13, wherein the content was formerly published and selected from results of a past search query.

15. The computer program product of claim 14, wherein the projected usage is further based on information about a user's satisfaction with the search results of past search queries.

16. The computer program product of claim 11, wherein past search queries include search queries occurring in a preceding time interval.

17. The computer program product of claim 11, wherein the past search queries include search queries that returned no useful results.

18. The computer program product of claim 11, wherein past search queries include search queries occurred when the content was formerly published.

19. The computer program product of claim 11, wherein the content is only accessible to a user in a set of search results returned from a search query when the content is published.

20. The computer program product of claim 11, wherein the applied one or more predefined criteria for publication determines an estimated probability that the unpublished content would be selected from a set of search results.

* * * * *